United States Patent
Leem et al.

(10) Patent No.: US 10,585,549 B2
(45) Date of Patent: Mar. 10, 2020

(54) MOBILE TERMINAL AND METHOD FOR CONTROLLING SAME

(71) Applicant: LG ELECTRONICS INC., Seoul (KR)

(72) Inventors: Chaesung Leem, Seoul (KR); Seunghoon Lee, Seoul (KR); Sungil Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

(21) Appl. No.: 15/510,635

(22) PCT Filed: Sep. 17, 2014

(86) PCT No.: PCT/KR2014/008676
§ 371 (c)(1),
(2) Date: Mar. 10, 2017

(87) PCT Pub. No.: WO2016/039496
PCT Pub. Date: Mar. 17, 2016

(65) Prior Publication Data
US 2017/0192621 A1    Jul. 6, 2017

(30) Foreign Application Priority Data
Sep. 11, 2014 (KR) .......................... 10-2014-0120444

(51) Int. Cl.
*G06F 3/0481* (2013.01)
*G06F 3/0488* (2013.01)
(Continued)

(52) U.S. Cl.
CPC ........ *G06F 3/0481* (2013.01); *G06F 3/04883* (2013.01); *H04N 5/23293* (2013.01); *H04N 5/77* (2013.01)

(58) Field of Classification Search
CPC .... G06F 3/0481; G06F 1/1626; G06F 1/1684; G06F 1/1686; G06F 3/0484; G06F 3/04883; H04N 5/23293; H04N 5/77
See application file for complete search history.

(56) References Cited

U.S. PATENT DOCUMENTS 5,729,471 A * 3/1998 Jain ...................... H04N 13/139
725/131
8,605,783 B2 * 12/2013 El-Saban ......... H04N 21/21805
375/240.1

(Continued)

FOREIGN PATENT DOCUMENTS

JP        2013258439       12/2013
KR    1020110069985        6/2011

(Continued)

OTHER PUBLICATIONS

PCT International Application No. PCT/KR2014/008676, International Search Report dated May 21, 2015, 2 pages.

(Continued)

*Primary Examiner* — Tadesse Hailu
(74) *Attorney, Agent, or Firm* — Lee, Hong, Degerman, Kang & Waimey

(57) ABSTRACT

The present invention provides a mobile terminal and a method for controlling the same. The mobile terminal comprises: a display unit; a memory in which videos are stored; and a control unit which performs control to allow a first video of the videos stored in the memory to be displayed on the display unit, and to allow an indication corresponding to a second video to be displayed on the display unit, wherein the second video is relevant to the first video with respect to at least one of shooting location, shooting time, shooting direction and subject similarity.

25 Claims, 23 Drawing Sheets

(51) Int. Cl.
*H04N 5/232* (2006.01)
*H04N 5/77* (2006.01)

(56) References Cited

U.S. PATENT DOCUMENTS

| | | | | |
|---|---|---|---|---|
| 2002/0115454 | A1* | 8/2002 | Hardacker | H04H 60/05 |
| | | | | 455/457 |
| 2009/0040308 | A1* | 2/2009 | Temovskiy | G02B 27/0068 |
| | | | | 348/158 |
| 2013/0162781 | A1* | 6/2013 | Hubner | H04N 5/2224 |
| | | | | 348/47 |
| 2013/0250047 | A1* | 9/2013 | Hollinger | H04N 5/2252 |
| | | | | 348/36 |
| 2015/0052546 | A1* | 2/2015 | Ortiz | A63B 71/06 |
| | | | | 725/28 |
| 2016/0286119 | A1* | 9/2016 | Rondinelli | G03B 17/12 |

FOREIGN PATENT DOCUMENTS

| | | |
|---|---|---|
| KR | 1020110133293 | 12/2011 |
| KR | 1020130068552 | 6/2013 |
| KR | 1020140104806 | 8/2014 |

OTHER PUBLICATIONS

Korean Intellectual Property Office Application No. 10-2014-0120444, Notice of Allowance dated Feb. 18, 2016, 2 pages.
Korean Intellectual Property Office Application No. 10-2014-0120444, Office Action dated Oct. 18, 2015, 6 pages.

* cited by examiner

FIG. 6
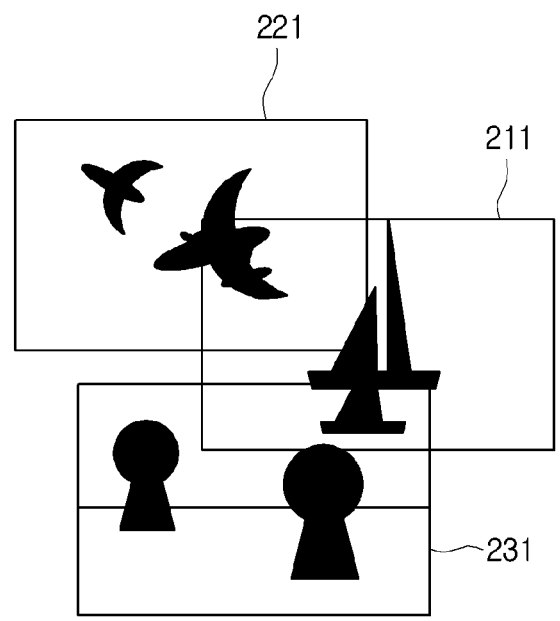
(a)
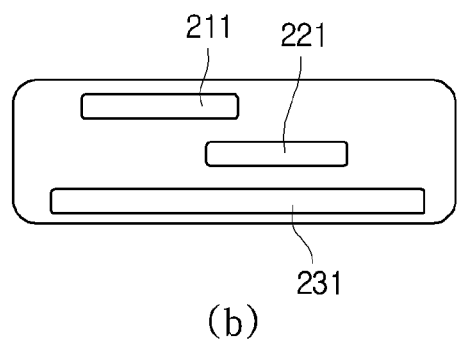
(b)

MOBILE TERMINAL AND METHOD FOR CONTROLLING SAME

CROSS-REFERENCE TO RELATED APPLICATIONS

This application is the National Stage filing under 35 U.S.C. 371 of International Application No. PCT/KR2014/008676, filed on Sep. 17, 2014, which claims the benefit of earlier filing date and right of priority to Korean Application No. 10-2014-0120444, filed on Sep. 11, 2014, the contents of which are all incorporated by reference herein in their entirety.

TECHNICAL FIELD

The present disclosure relates to a mobile terminal, use of which is implementable by further taking into account user's convenience, and a method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Efforts are ongoing to support and increase the functionality of mobile terminals. Such efforts include software and hardware improvements, as well as changes and improvements in the structural components.

In the case of a movie or a TV drama, since one scene is captured by cameras disposed at a plurality of places and images respectively captured by the cameras are edited and provided, a user may view one scene at view angles in various directions, and thus, may appreciate a more live and realistic image.

When the user is to display a plurality of videos related to one another in terms of a time and a location, the user has no choice but to play and view the plurality of videos in a selected order or play and view the plurality of videos at the same time. Thus, the user may not appreciate a movie or a TV drama as a live and realistic image.

In addition, when there is a video related to a video currently displayed, there is no way to inform the user of the related video. In particular, there is no way to the user of the presence of the video related to the video currently displayed and allow for the user to intuitionally display the related video.

Furthermore, when the user is to search for the video related to the video currently displayed, there is a limitation in that the related video is found when the user confirms thumbnail images of all videos one by one.

DISCLOSURE OF THE INVENTION

Technical Problem

Embodiments provide a terminal capable of displaying a video such that a user appreciates the video lively and realistically, and a method for controlling the terminal.

Embodiments also provide a terminal capable of informing a user of the presence of a video related to a video currently displayed and allowing the user to intuitionally display the related video, and a method for controlling the terminal.

Embodiments also provide a terminal capable of allowing a user to easily searching for a video related to a video currently displayed, and a method for controlling the terminal.

Technical Solution

In one embodiment, a mobile terminal includes: a display unit; a memory configured to store videos; and a controller configured to perform control to display a first video of the videos stored in the memory on the display unit and display a mark corresponding to a second video on the display unit, the second video being related to the first video in terms of at least one of similarity of a photographing position, similarity of a photographing direction, and similarity of a subject.

The controller may perform control to display the mark corresponding to the second video on a periphery or a subject of the first video.

When a touch input is input on the mark corresponding to the second video, the controller may perform control to display the second video on the display unit. In this case, the controller may perform control to display a mark corresponding to the first video on the second video.

A photographing position and a photographing time of the second video may be different by a certain degree or less from those of the first video, respectively. A photographing time of at least a portion in the second video may be the same as that of at least a portion in the first video. Similarity between a subject of the second video and a subject of the first video may be greater than or equal to a certain degree.

The controller may perform control to display the mark corresponding to the second video on the display unit according to a photographing position and a photographing direction of the second video based on a photographing position and a photographing direction of the first video.

When a first pinch-in touch is input on the display unit, the controller may perform control to display the mark corresponding to the second video on the first video.

When a first pinch-in touch is input on the display unit, the controller may perform control to reduce and display the first video on the display unit and display an image of the second video on the display unit as a mark corresponding to the second video.

When a second pinch-in touch is input on the display unit, the controller may perform control to display a third video of the videos stored in the memory on the display unit according to proximity of a photographing place and proximity of the photographing time to the first video.

As the proximity of the photographing place and the proximity of the photographing time to the first video are increased, the second video and the third video may be disposed more adjacent to the first video and a screen thereof may be displayed to a larger size.

The controller may perform control to display an image of the second video, which is captured at the same time as an image of the first image currently played.

When a first pinch-out touch is input on the display unit, the controller may perform control to display the mark corresponding to the second video on the first video.

When a second pinch-out touch is input on the mark corresponding to the second video, the controller may perform control to display the second video on the display unit. In this case, when a pinch-in touch is input on the second video, the controller may perform control to reduce and display the second video and display the first video related to the second video.

In another embodiment, provided is a mobile terminal including: a camera configured to capture a first video; a display unit configured to display the first video captured by the camera; a wireless communication unit configured to transmit/receive data; and a controller configured to control the camera, the display unit, and the wireless communication unit and perform control to display a mark corresponding to a second video transmitted from an external terminal on the first video according to a photographing position and a photographing direction of the external device, the external terminal being connected to the wireless communication unit through a network.

The mark corresponding to the second video may be an image of the second video.

Advantageous Effects

According to at least one of embodiments of the present disclosure, it is possible to provide a terminal capable of displaying a video such that a user appreciates the video lively and realistically, and a method for controlling the same.

According to at least one of embodiments of the present disclosure, it is possible to provide a terminal capable of informing a user of the presence of a video related to a video currently displayed and allowing the user to intuitively display the related video, and a method for controlling the same.

According to at least one of embodiments of the present disclosure, it is possible to provide a terminal capable of allowing a user to easily searching for a video related to a video currently displayed, and a method for controlling the same.

Further scope of the applicability of the present disclosure will be clarified through the detailed description given hereinafter. It should be understood, however, that the specific examples, while indicating preferred embodiments of the present disclosure, are presented for illustration only. Various changes and modifications within the spirit and scope of the present disclosure should become apparent to those skilled in the art from this detailed description.

BRIEF DESCRIPTION OF THE DRAWINGS

FIGS. 4 to 6 are diagrams illustrating that videos are captured by a plurality of mobile terminals in a mobile terminal and a method for controlling the same according to embodiments of the present disclosure.

MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
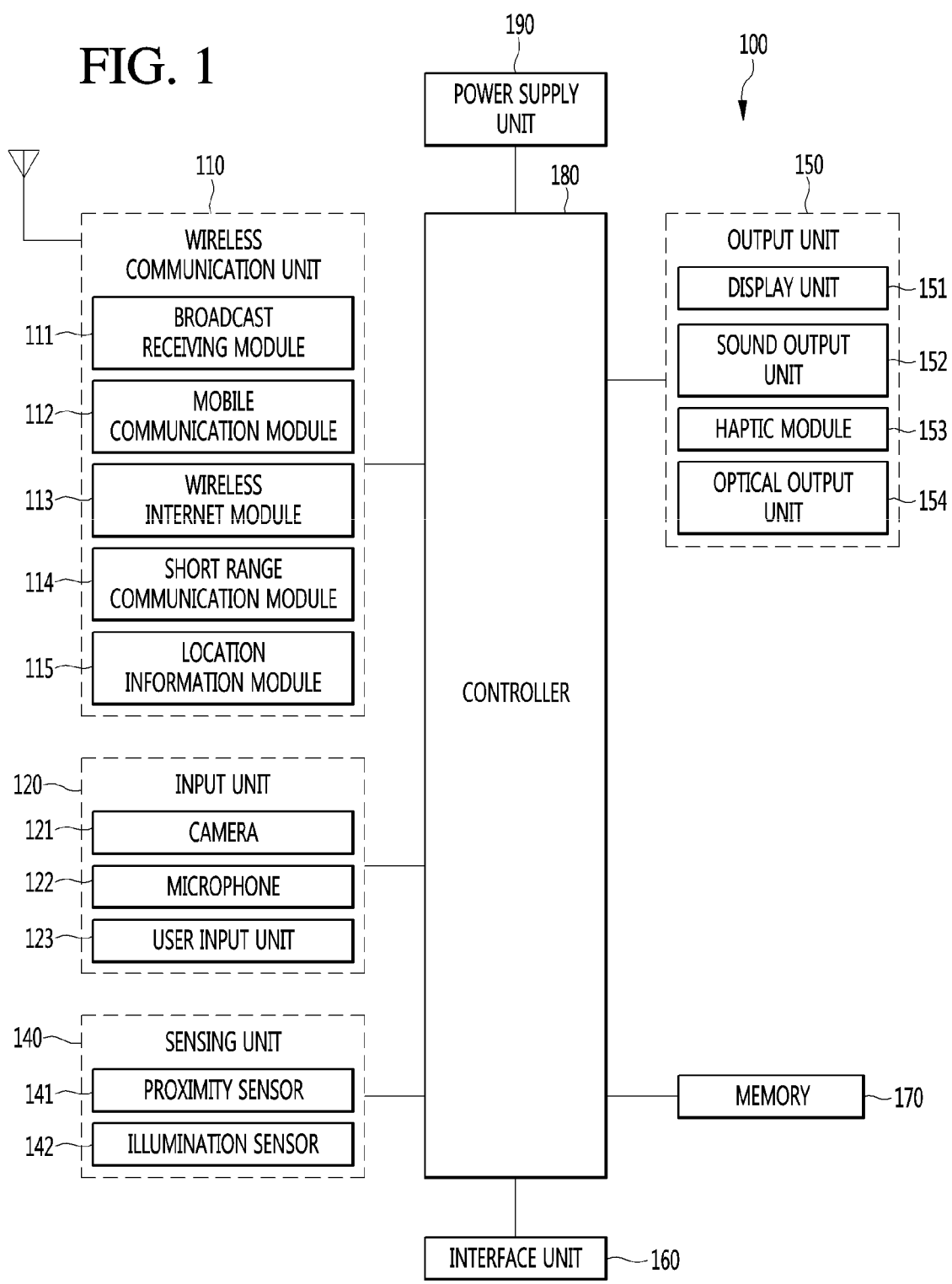
FIG. 1 is a block diagram of a mobile terminal in accordance with the present disclosure.
Figure 2:
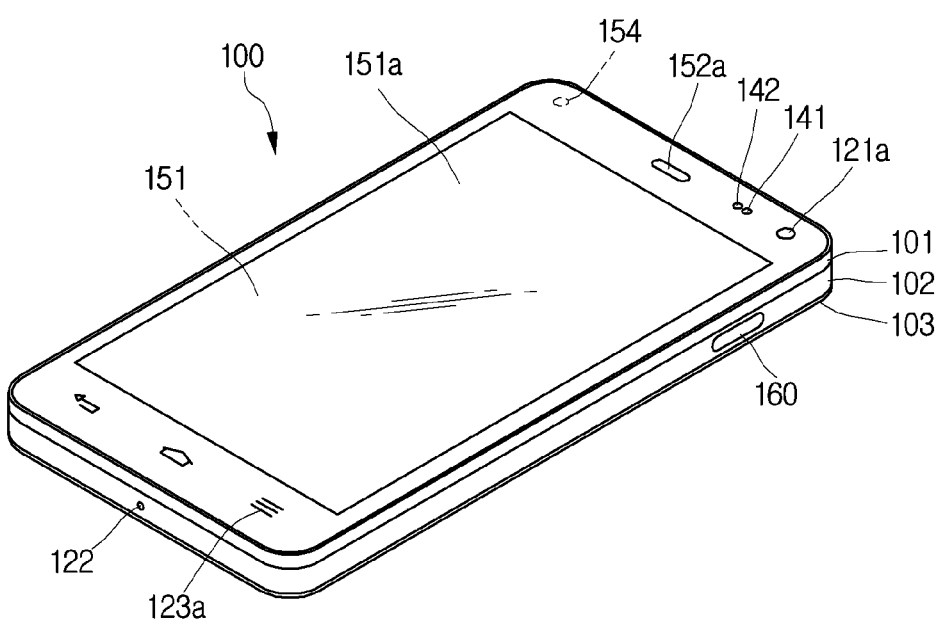
FIGS. 2 and 3 are conceptual views of one example of the mobile terminal, viewed from different directions.
Figure 3:
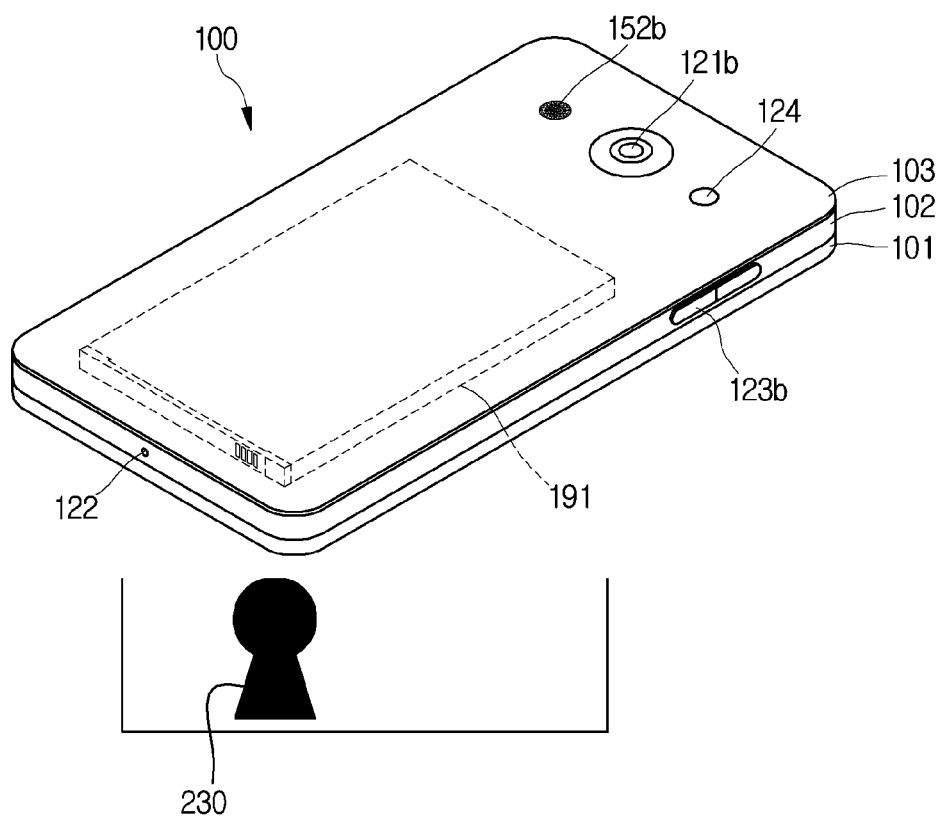

Reference is now made to FIGS. 1-3, where FIG. 1 is a block diagram of a mobile terminal in accordance with the present disclosure, and FIGS. 2 and 3 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1-3 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, first and second audio output modules 151a/151b, a proximity sensor 141, an illumination sensor 142, an optical output module 154, first and second cameras 121a/121b, first and second manipulation units 123a/123b, a microphone 122, interface unit 160 and the like.

It will be described for the mobile terminal as shown in FIGS. 2 and 3. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a.

Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2 illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 3, a flash 124 is shown adjacent to the second camera 121b. When an image of a subject is captured with the camera 121b, the flash 124 may illuminate the subject.

As shown in FIG. 2, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments related to a controlling method implementable in a mobile terminal as described above will be described with reference to the accompanying drawings. It is obvious to those skilled in the art that the present disclosure may be embodied in different forms without departing from the sprit and scope of the present disclosure.

Figure 4:
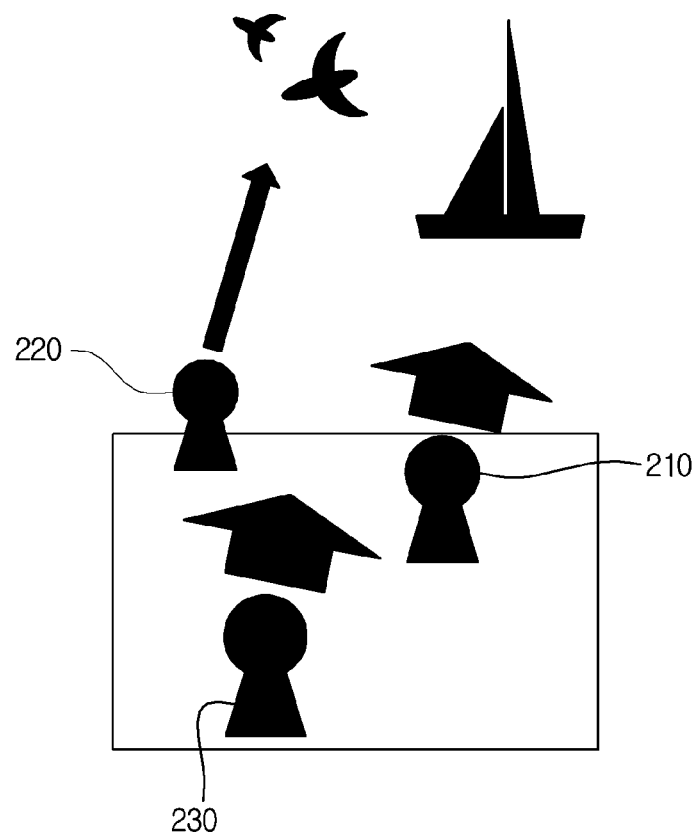
Figure 5:
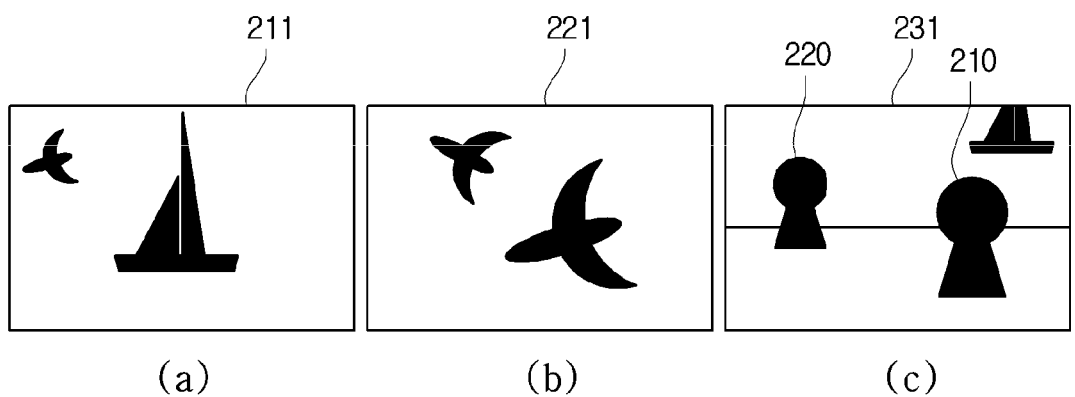

FIGS. 4 to 6 are diagrams illustrating that videos are captured by a plurality of mobile terminals in a mobile terminal and a method for controlling the same according to embodiments of the present disclosure.

FIG. 4 illustrates that three users capture videos through three mobile terminals. A first user captures a video of a scene including a gull and a ship by using a first mobile terminal 210, a second user captures a video of a scene including gulls by using a second mobile terminal 220, and a third user captures the first and the second users and a ship by using a third mobile terminal 230, the first and the second users performing capturing by using the first mobile terminals 210 and the second the mobile terminal 220.

The three users do not capture the videos at the accurately same position, but capture the videos at positions adjacent to one another. The three users do not capture the videos for the same time, but capture the videos for a partially same time.

FIG. 5 illustrates one image of each of the videos captured by the three users. A first video 211 captured by the first mobile terminal 210 is illustrated in (a) of FIG. 5, a second video 221 captured by the second mobile terminal 220 is illustrated in (b) of FIG. 5, and a third video 231 captured by the third mobile terminal 230 is illustrated in (c) of FIG. 5.

The first to third videos 211 to 231 captured by the first to third mobile terminals 210 to 230 may be differ from one another in a subject intensively to be photographed, but may overlap one another in terms of a location and a time. Portions of subjects appearing in the first to third videos 211 to 231 may overlap each other.

Each of the first to third videos 211 to 231 is stored together with metadata including a photographing place and a photographing time. In addition, the metadata may include information on a photographing direction. For example, the photographing place may be measured through a GPS module of a mobile terminal, the photographing direction may be measured through a magnetic sensor, and the photographing time may be measured through the GPS module or an internal timer of the mobile terminal.

Meanwhile, the first to third videos 211 to 231 may be images respectively captured through different cameras and be images respectively captured during different periods through one camera. This is also applied to embodiments described later. The first to third videos 211 to 231 may have different file names and different pieces of metadata. Therefore, the first to third videos 211 to 231 are respectively videos different from one another. For example, an image of a partial section in the first video 211 does not become the second and the third videos 221 and 223.

Place or time relevance between the first video 211, the second video 221, and the third videos 231 is illustrated in FIG. 6.

As shown in (a) of FIG. 6, since the first to third videos 211 to 231 are acquired by photographing similar scenes at adjacent places, portions of subjects may overlap each other. Of course, as shown in (a) of FIG. 6, since each of the first to third videos 211 to 231 is one screen of a video having a certain length, a screen, on which portions of subjects overlapping each other, may repeat several times.

As shown in (b) of FIG. 6, after the third video 231 starts to be firstly captured, the first video 211 may start to be captured. While the third video 231 and the first video 211 are captured, the second video 221 may start to be captured. The capturing of the first video 211 is ended while the third video 231 and the second video 221 are captured, and then, the capturing of the second video 221 is ended. Finally, the capturing of the third video 231 is ended.

As described abode, the first to third videos 211 to 231 do not need to be captured for the same time, and portions of the first to third videos 211 to 231 may be captured for the same time.

On the other hand, the first to third videos 211 to 231 respectively captured and stored by the first to third mobile terminals 210 to 230 may be transmitted and stored in any one of the first to third mobile terminals 210 to 230 or another mobile terminal. A mobile terminal receiving and storing the first to third videos 211 to 231 may become the mobile terminal implementing a function of the present disclosure, according to the present disclosure.

For example, the second video 221 and the third video 231 respectively stored in the second mobile terminal 220 and the third mobile terminal 230 may be stored in the first mobile terminal 210 through a mobile storage medium including a flash memory.

In addition, the second video 221 and the third video 231 respectively stored in the second mobile terminal 220 and the third mobile terminal 230 may be transmitted and stored in the first mobile terminal 210 through BLUETOOTH™, Wi-Fi, and infrared-ray communication.

Furthermore, the second video 221 and the third video 231 respectively stored in the second mobile terminal 220 and the third mobile terminal 230 may be transmitted and stored in the first mobile terminal 210 in a state of being attacked to an email or through a message.

In addition, the second video 221 and the third video 231 respectively stored in the second mobile terminal 220 and the third mobile terminal 230 may be transmitted and stored in the first mobile terminal 210 in a state of being attached to an email or through a message.

In addition, the second video 221 and the third video 231 respectively stored in the second mobile terminal 220 and the third mobile terminal 230 may be transmitted and stored in the first mobile terminal 210 through a method of uploading the second video 221 and the third video 231 to an Internet website and downloading the second video 221 and the third video 231 from the Internet website.

Furthermore, the first to third videos 211 to 231 respectively captured by the first to third mobile terminals 210 to 230 may be stored or displayed in real time or be edited and stored in the first to third mobile terminals 210 to 230 through a group recording function.

FIGS. 7 to 10 are diagrams illustrating a group recording function in a mobile terminal and a method for controlling the same according to embodiments of the present disclosure.

Figure 7:
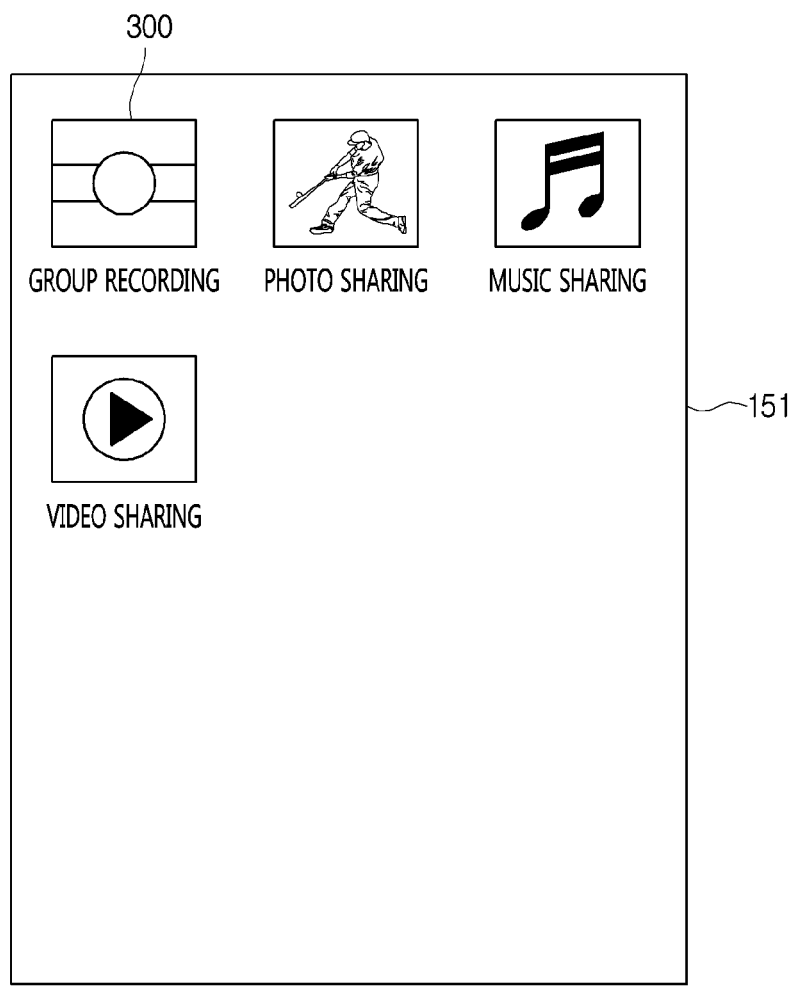
FIGS. 7 to 10 are diagrams illustrating a group recording function in a mobile terminal and a method for controlling the same according to embodiments of the present disclosure.

Referring to FIG. 7, the group recording function may be executed between a plurality of mobile terminals. For example, when there are first to third mobile terminals 210 to 230, a group recording object 300 for executing the group recording function may be selected and executed in at least one mobile terminal. The group recording object 300 may be displayed on a display unit 151 of a mobile terminal together with a photo sharing object, a music sharing object, a video sharing object, and the like.

The group recording function provides a function allowing a plurality of mobile terminals to share videos captured in real time therefrom to store/play or edit/store the videos rather than a function allowing the plurality of the mobile terminals to share a pre-stored photo, pre-stored music, and a pre-stored video as sharing a photo, music, and a video. The aforementioned function herein has been called the "group recording function" for convenience, but may be called other names. The preset disclosure is not limited to the names.

Figure 8:
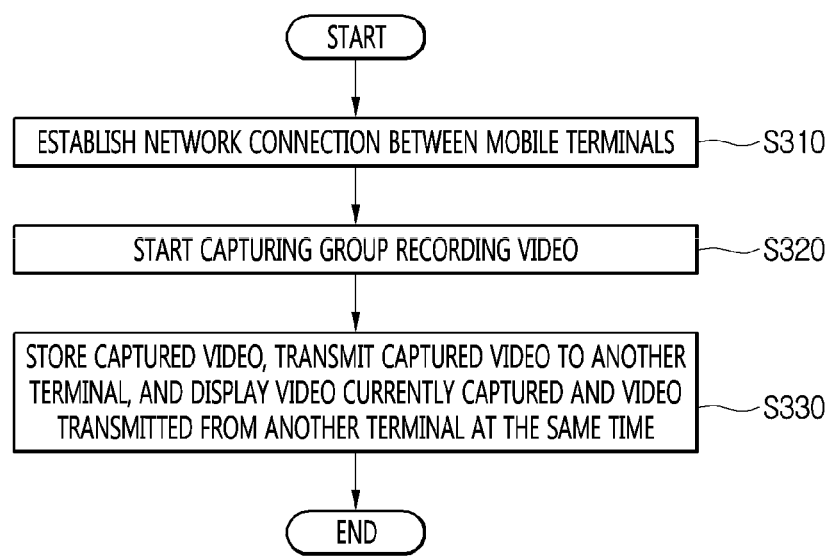

Referring to FIG. 8, in order to execute the group recording function, a network connection is established between a plurality of mobile terminals (S310). The network connection may be established through various methods such as a method for executing the group recording object 300 through any one mobile terminal and transmitting a group recording execution request to another mobile terminal and a method for executing the group recording object 300 through all mobile terminals participating in group recording. The network connection between the plurality of mobile terminals may be established by various wireless communication methods such as Wi-Fi and BLUETOOTH™. The network connection may be set to be established with a mobile terminal of a preregistered user such as a "friend registration", be established between users who join and register for a specific SNS, or be established between users located within a certain place through a request. The network connection may be variously designed, and the present disclosure is not limited thereto.

When the group recording starts, videos start to be captured by mobile terminals, respectively (S320). The capturing of the videos may be concurrently performed by the mobile terminals at the time of executing the group recording, and the capturing of one of the videos may be firstly performed by any one mobile terminal.

The capturing of the videos may be performed on the same subject or on different subjects. In addition, the same subject may be partially included in the videos captured by the plurality of mobile terminals.

Since each of the plurality of mobile terminals includes a GPS module and a magnetic sensor, each of the plurality of mobile terminals may grasp a location and a direction in which a video is captured, store information on a photographing position and a photographing direction together with the video, and transmit the information and the video to another mobile terminal to share the information and the video with another mobile terminal.

Each of the captured videos may be stored in a memory 170 of each of the plurality of mobile terminals and be transmitted to another mobile terminal in real time. In addition, a video transmitted from another mobile terminal may be stored in the memory 170 of a mobile terminal. Furthermore, a video currently captured may be displayed in the display unit 151 of the mobile terminal. In addition, the video captured and transmitted from another mobile terminal may be concurrently displayed inside or outside of the video currently captured and displayed (S330).

Figure 9:
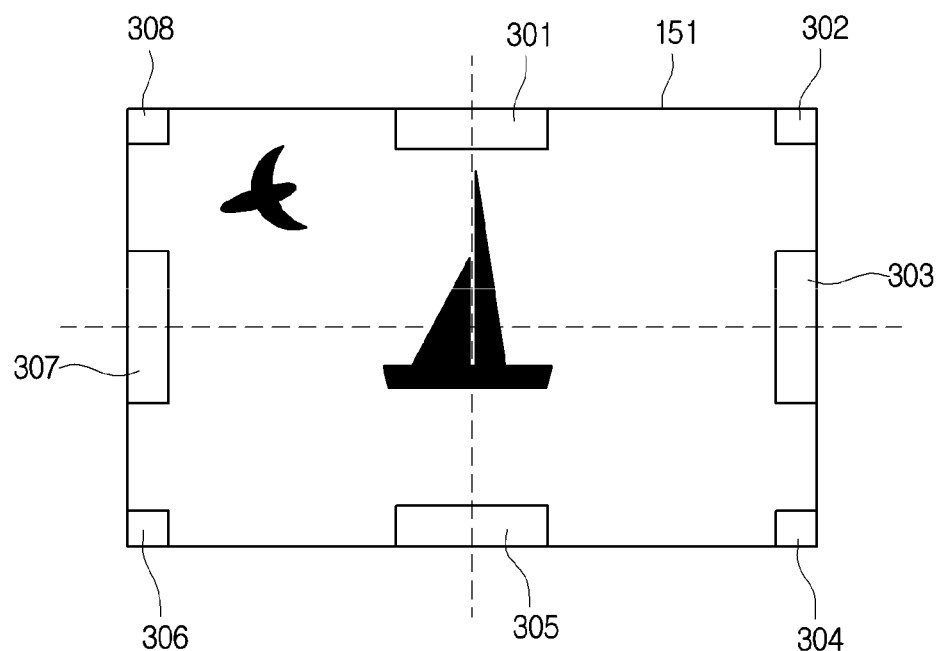
Figure 10:
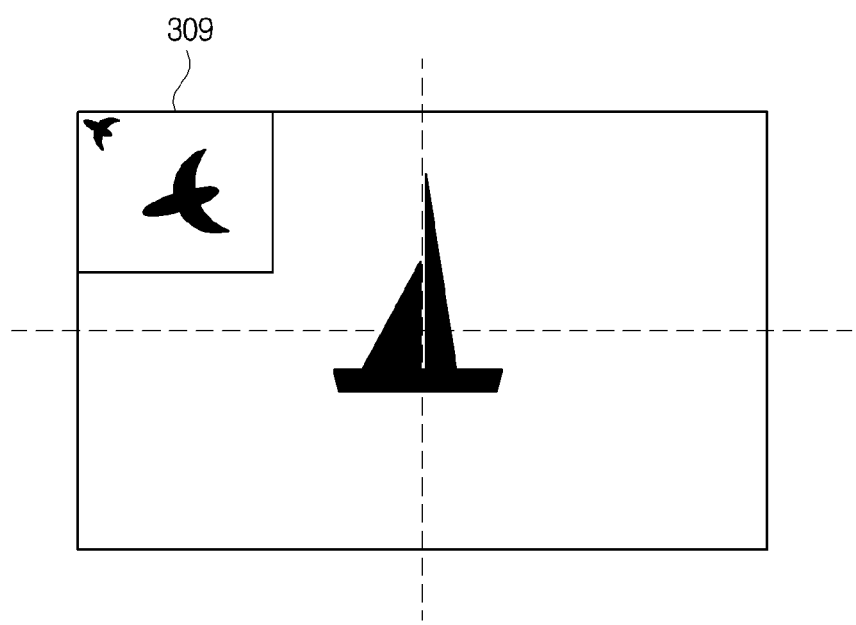

FIGS. 9 and 10 are diagrams illustrating a screen displayed on a mobile terminal of a user in a process of playing and displaying a video stored while or after group recording is executed.

Referring to FIG. 9, when the user currently captures a video through a camera 121 of a first mobile terminal 210, the currently captured video is displayed on a display unit 151 by a controller 180. The first mobile terminal 210 captures a scene including a gull and a ship. On the other hand, a video captured by another mobile terminal executing group recording with the first mobile terminal 210 is received through a wireless communication unit 110 and is displayed on one side of the display unit 151 by the controller 180. The controller 180 may display the video transmitted from another mobile terminal on the display unit and store the video in the memory 170 at the same time.

For example, each of first to eighth display regions 301 to 308 may relatively indicate a photographing position and a photographing direction of another mobile terminal executing group recording with the first mobile terminal 210 with respect to a photographing position and a photographing direction of the first mobile terminal 210.

For example, the first display region 301 may indicate the presence of a video by captured in the same direction as the photographing direction of the first mobile terminal 210 or in a similar direction in a range of a first angle or less in a clockwise direction or a counterclockwise direction with respect to the photographing direction of the first mobile terminal 210 by another mobile terminal in a state of being disposed in a front with respect to the photographing direction of the first mobile terminal 210. Furthermore, the second display region 302 may indicate the presence of a video by captured in a right direction with respect to the photographing direction of the first mobile terminal 210, for example, a direction in a range of greater than the first angle and equal to or less than 180° in a clockwise direction with respect to the photographing direction of the first mobile terminal 210 by another mobile terminal in a state of being disposed in a front with respect to the photographing direction of the first mobile terminal 210. In addition, the third display region 303 may indicate the presence of a video by captured in a right direction with respect to the photographing direction of the first mobile terminal 210, for example, a direction in a range of greater than the first angle and equal to or less than 180° in a clockwise direction with respect to the photographing direction of the first mobile terminal 210 by another mobile terminal in a state of being disposed in a right with respect to the photographing direction of the first mobile terminal 210. In addition, the fourth display region 304 may indicate the presence of a video by captured in a right direction with respect to the photographing direction of the first mobile terminal 210, for example, a direction in a range of greater than the first angle and equal to or less than 180° in a clockwise direction with respect to the photographing direction of the first mobile terminal 210 by another mobile terminal in a state of being disposed in a rear with respect to the photographing direction of the first mobile terminal 210. Furthermore, the fifth display region 305 may indicate the presence of a video by captured in the same direction as the photographing direction of the first mobile terminal 210 or in a similar direction in a range of the first angle or less by another mobile terminal in a state of being disposed in a rear with respect to the photographing direction of the first mobile terminal 210. Furthermore, the sixth display region 306 may indicate the presence of a video by captured in a left direction with respect to the photographing direction of the first mobile terminal 210, for example, a direction in a range of greater than the first angle and equal to or less than 180° in a counterclockwise direction with respect to the photographing direction of the first mobile terminal 210 by another mobile terminal in a state of being disposed in a left with respect to the photographing direction of the first mobile terminal 210. In addition, the seventh display region 307 may indicate the presence of a video by captured in a left direction with respect to the photographing direction of the first mobile terminal 210, for example, a direction in a range of greater than the first angle and equal to or less than 180° in a counterclockwise direction with respect to the photographing direction of the first mobile terminal 210 by another mobile terminal in a state of being disposed in a left with respect to the photographing direction of the first mobile terminal 210. In addition, the eighth display region 308 may indicate the presence of a video by captured in a left direction with respect to the photographing direction of the first mobile terminal 210, for example, a direction in a range of greater than the first angle and equal to or less than 180° in a counterclockwise direction with respect to the photographing direction of the first mobile terminal 210 by another mobile terminal in a state of being disposed in a front with respect to the photographing direction of the first mobile terminal 210.

For example, the first angle may be set to an angle of 30° in a clockwise direction and an angle of 30° in a counterclockwise direction with respect to the photographing direction of the first mobile terminal 210.

As described above, the mobile terminal according to the present disclosure may display a video captured by another mobile terminal on each of the first to eighth display regions 301 to 308 on the display unit 151 of the first mobile terminal 210 which displays the video currently captured, according to the photographing position and the photographing direction of the another mobile terminal in a process of executing group recording. That is, the first mobile terminal 210 may grasp the photographing position and the photographing direction of the another mobile terminal from the video and metadata including a photographing time, a photographing position, and a photographing direction of the video, the video and the metadata being transmitted from the another mobile terminal through a wireless communication unit 110. Accordingly, the first mobile terminal 210 may display the video on any one of the first to eighth display regions 301 to 308.

For example, when the display unit of the first mobile terminal 210 is divided with a virtual horizontal line and a virtual vertical line passing through a center thereof, display regions on both sides with respect to the virtual horizontal line indicate that the another mobile terminal is disposed in the front or the rear of the first mobile terminal 210 in the photographing direction of the first mobile terminal 210, and display regions on both sides with respect to the virtual vertical line indicate that the another mobile terminal performs capturing in a direction different from the photographing direction of the first mobile terminal 210 by a certain angle in a clockwise direction or a counterclockwise direction with respect to the photographing direction of the first mobile terminal 210.

The first to eighth display regions 301 to 308 are illustrated in FIG. 9 as being displayed in a rectangular shape on a periphery of the display unit 151, but the shape of each of the first to eighth display regions 301 to 308 may be variously designed. For example, an icon having a camera shape may be displayed on each of the first to eighth display regions 301 to 308. In addition, instead of the first to eighth display regions 301 to 308 having the rectangular shape, a video or a thumbnail image actually captured by another mobile terminal may be displayed at a position of each of the first to eighth display regions 301 to 308.

For example, in the case of FIG. 4, the second video 221 captured by the second mobile terminal 220 may be displayed on the first display region 301, the third video 231 captured by the third mobile terminal 230 may be displayed on the fifth display region, and other display regions may not be displayed.

When any one of the first to eighth display regions 301 to 308 is selected through a touch or other methods while a video currently captured or a video captured by the first mobile terminal 301 is displayed, a video of a mobile terminal corresponding to the selected display region may be displayed on the display unit 151, and display regions may be newly displayed with respect to a photographing position and a photographing direction of the mobile terminal corresponding to the selected display region. Furthermore, when any one of the first to eighth display regions 301 to 308 is selected through a touch or other methods according to settings, the video captured by the mobile terminal corresponding to the selected display region may be enlarged and displayed like a picture-in picture (PIP) screen while the video currently captured or the video captured by the first mobile terminal 210 is displayed as itself.

Referring to FIG. 10, in another embodiment, when a subject included in the video captured by other display unit executing group recording with the first mobile terminal 210 is the same as a subject included in the video captured by the first mobile terminal 210, an overlap region 309 may be displayed on a portion of a screen displayed on the display unit 151 of the first mobile terminal 210. A controller 180 of the mobile terminal 210 may grasp a photographing position and a photographing direction from a video and metadata on the video received from another mobile terminal and may extract subjects having high similarity by image-analyzing videos. Therefore, the controller 180 may display the overlap region 309 on a portion of an image including similar subjects.

For example, sameness or similarity may be determined between the video captured by the first mobile terminal 210 and the video captured by another mobile terminal through an image analysis. When a certain degree of similarity is recognized, it may be determined that the video captured by the first mobile terminal 210 and the video captured by another mobile terminal include the same subject. In addition, when a photographing position and a photographing direction of the first mobile terminal 210 and a photographing position and a photographing direction of another mobile terminal are adjacent photographing positions and similar photographing directions through a comparative analysis thereof, the overlap region 309 may be displayed.

When the overlap region 309 is selected through a touch or other methods, the controller 180 may perform control to display a video of a mobile terminal corresponding to the selected overlap region 309 and newly display overlap regions with respect to a photographing position and a photographing direction of the mobile terminal corresponding to the selected overlap region 309. Furthermore, when a user selects the overlap region 309 through a touch or other methods according to settings, the controller 180 may perform control to enlarge and display the video of the mobile terminal corresponding to the selected overlap region 309 like a picture-in picture (PIP) screen while displaying a video currently captured or a video captured by the first mobile terminal 210 as itself.

A screen has been illustrated in FIGS. 9 and 10 as being displayed in a process of capturing a video in real time by executing group recording. This may also be equally applied to a process of playing a stored video by executing group recording.

Figure 11:
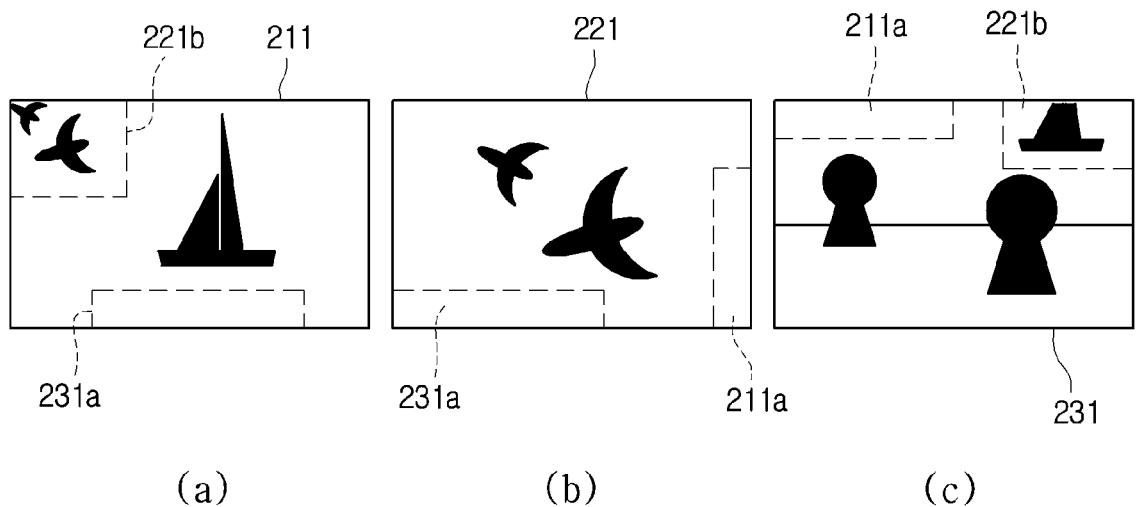
FIGS. 11 to 13 are diagrams illustrating that a video captured and stored or a video currently captured by each of a plurality of mobile terminals is displayed in a mobile terminal and a method for controlling the same according to embodiments of the present disclosure.
Figure 12:
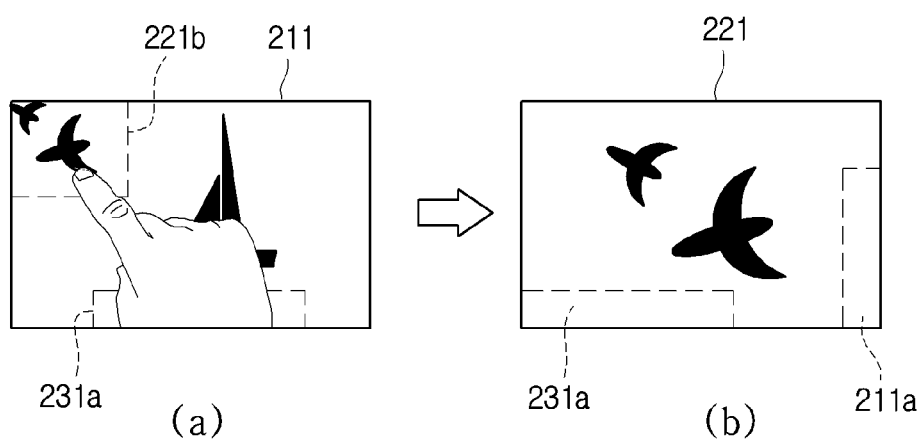
Figure 13:
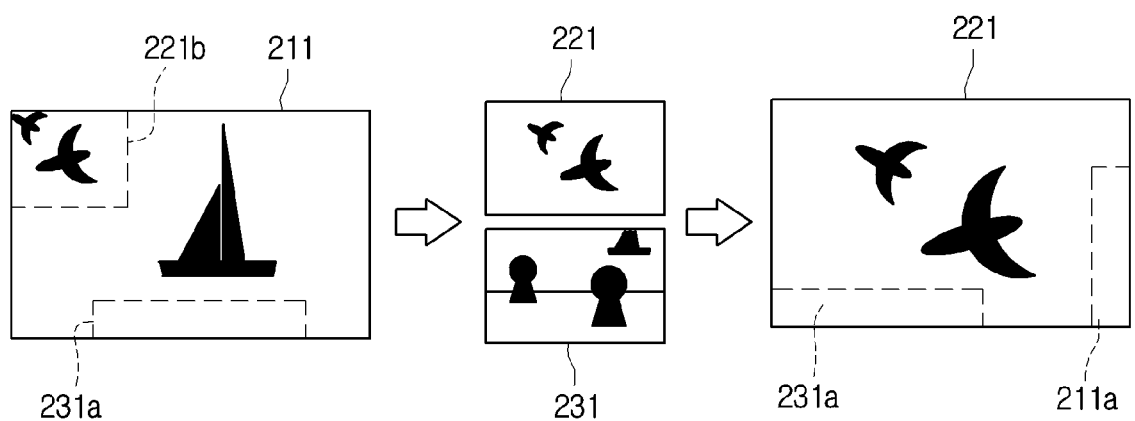

FIGS. 11 to 13 are diagrams illustrating that a video captured and stored or a video currently captured by each of a plurality of mobile terminals is displayed in a mobile terminal and a method for controlling the same according to embodiments of the present disclosure.

Referring to FIG. 11, a first video 211 is illustrated in (a) of FIG. 11 as being displayed on a display unit 151 of a first mobile terminal 210. An overlap region 221b corresponding to a second video 221 captured by a second mobile terminal 220 may be displayed on the first video 211 based on similarity of a photographing position, similarity of a photographing direction, similarity of a photographing time, and similarity of a subject. In addition, a display region 231a corresponding to a third video 231 captured by a third mobile terminal 230 may be displayed on the first video 211 based on similarity of a photographing position, similarity of a photographing direction, similarity of a photographing time, and similarity of a subject.

According to an embodiment, when a pinch-in touch is input on the display unit 151 while the first video 211 is displayed, a controller 180 may perform control to display the overlap region 221b and the display region 231a on the first video 211, the overlap region 221b being a mark corresponding to the second video 221 and the display region 231a being a mark corresponding to the third video 231. In addition, a photographing position and a photographing time of each of the second video 221 and the third video 231 are different by a certain degree or less from those of the first video 211. At least a partial image of each of the second video 221 and the third video 231 may have the same photographing time as that of the first video 211. In addition, similarity between a subject of at least a partial image in the second video 221 and a subject of at least a partial image in the first video 211 may be greater than or equal to a certain degree. The descriptions may also be equally applied to descriptions of (b) and (c) of FIG. 11.

In addition, the second video 221 is illustrated in (b) of FIG. 11 as being displayed on a display unit 151 of the second mobile terminal 210. A display region 211a corresponding to the first video 211 captured by the first mobile terminal 210 may be displayed on the second video 221 based on similarity of a photographing position, similarity of a photographing direction, similarity of a photographing time, and similarity of a subject. In addition, the display region 231a corresponding to the third video 231 captured by the third mobile terminal 230 may be displayed on the second video 221 based on similarity of a photographing position, similarity of a photographing direction, similarity of a photographing time, and similarity of a subject.

Furthermore, the third video 231 is illustrated in (c) of FIG. 11 as being displayed on a display unit 151 of the third mobile terminal 230. The display region 211a corresponding to the first video 211 captured by the first mobile terminal 210 may be displayed on the third video 231 based on similarity of a photographing position, similarity of a photographing direction, similarity of a photographing time, and similarity of a subject. In addition, the overlap region 221*b* corresponding to the second video 221 captured by the second mobile terminal 220 may be displayed on the third video 231 based on similarity of a photographing position, similarity of a photographing direction, similarity of a photographing time, and similarity of a subject.

Referring to FIG. 12, when the overlap region 221*b* corresponding to the second video 221 is selected through a touch or other methods while the first video 211 is displayed on any one mobile terminal of the first to third mobile terminals 210 to 230, the controller 180 may perform control to display the selected second video 221. The controller 180 may perform control to display the display regions 211*a* and 231*a* respectively corresponding to the first video 211 and the third video 231.

According to an embodiment, as shown in FIG. 6, at least portions of the first to third videos 211 to 231 may be captured at the same time as one another, and the overlap region 221*b* or the display regions 211*a* and 231*a* may also be displayed only on screens of videos captured at the same time as each other. For example, when the second video 221 and the third video 231 are captured after the capturing of the first video 211 is ended, one of the overlap region 221*b* and the display region 231*a* respectively corresponding to the second video 221 and the third video may not be displayed although the first video 211 is displayed.

According to another embodiment, the overlap region 221*b* or the display regions 211*a* and 231*a* may also be displayed on screens of videos not captured at the same time as each other. In this case, it may be determined whether to display the overlap region 221*b* or the display regions 211*a* and 231*a* according to proximity of a photographing position, similarity of a photographing direction, or similarity of a subject.

Referring to FIG. 13, when the displaying of the first video 211 is ended and the overlap region 221*b* and the display region 231*a* are not selected, the controller 180 may determine similarity between the first video 211 and each of the second and third videos 221 and 231 and perform control to display the second video 221 more similar to the first video 211 just after the first video 211 to thereby perform a natural image conversion. In this case, the display region 211*a* corresponding to the first video 211 and the display region 231*a* corresponding to the third video 231 may be displayed.

Figure 14:
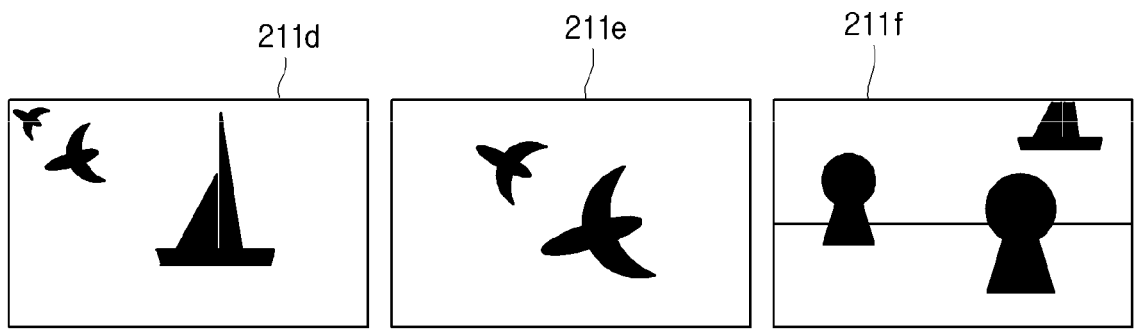
FIG. 14 is a diagram illustrating that a video captured and stored by one mobile terminal is displayed in a mobile terminal and a method for controlling the same according to an embodiment of the present disclosure.

FIG. 14 is a diagram illustrating that a video captured and stored by one mobile terminal is displayed in a mobile terminal and a method for controlling the same according to an embodiment of the present disclosure.

Referring to FIG. 14, the user may capture a first video 211*d* for a first time and store the first video 211*d*, capture a second video 211*e* for a second time and store the second video 211*e*, and capture a third video 211*f* for a third time and store the third video 211*f* through a first mobile terminal 210.

When the user plays the first to third videos 211*d* to 211*f* captured and stored through the first mobile terminal 210, images captured at the same time as one another may not be present in the first to third videos 211*d* to 211*f*. Accordingly, although any one video is played, an overlap region or a display region may not be displayed. However, in this case, when the first to third videos 211*d* to 211*f* are analyzed and similarity between subjects is greater than or equal to a certain degree, the subjects are determined to be the same subject. A sync of a video is adjusted with respect to a time at which the same subject appears. Therefore, an overlap region may be displayed at the time at which the same subject appears.

On the other hand, according to another embodiment, the first video 211*d* for the first time, the second video 211*e* for the second time, and the third video 211*f* for the third time do not need to be captured by one same mobile terminal and may be respectively videos captured for different times and stored through a plurality of mobile terminals.

In addition, according to another embodiment, at least one of the first video 211*d* for the first time, the second video 211*e* for the second time, and the third video 211*f* for the third time may be a video downloaded from an Internet site such as Facebook or YouTube. For example, after the user stores a video captured in front of the Eiffel Tower in Paris and other user downloads a video in front of the Eiffel Tower uploaded to YouTube and stores the downloaded video, the two videos may be played together. In this case, an overlap region may be displayed on a screen on which the Eiffel Tower is displayed.

As described above, when the user selects an overlap region while a video is played, other video related to the overlap video may be played.

FIGS. 15 to 23 are diagrams illustrating that videos are aligned and displayed in a mobile terminal and a method for controlling the same according to embodiments of the present disclosure.

First, videos are illustrated in FIGS. 15 to 18 as being aligned and displayed through a pinch-in touch, and videos are illustrated in FIGS. 19 to 22 as being aligned and displayed through a pinch-out touch.

The pinch-in touch means an operation of touching two touch points on a touch screen, and then, decreasing a relative distance between the two touch points. On the contrary, the pinch-out touch means an operation of increasing a relative distance between two touch points.

Figure 15:
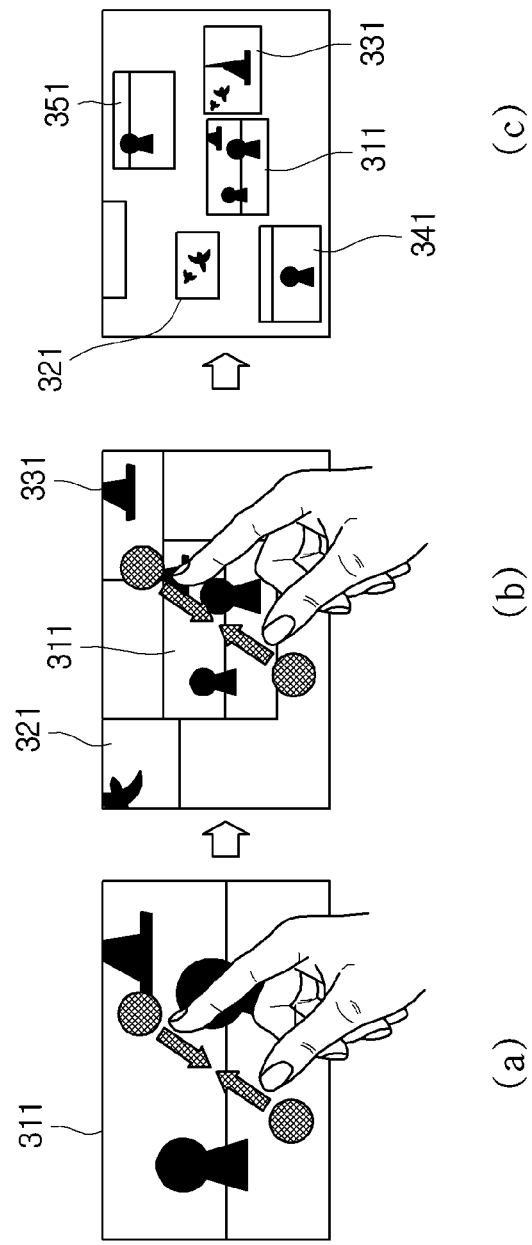
FIGS. 15 to 23 are diagrams illustrating that videos are aligned and displayed in a mobile terminal and a method for controlling the same according to embodiments of the present disclosure.

Referring to FIG. 15, when a user inputs a pinch-in touch operation on a display unit 151 in (a) of FIG. 15 while a first video 311 is displayed on the display unit 151 including a touch screen formed thereon, as shown in (b) of FIG. 15, while the first video 311 is reduced and displayed, a second video 321 and a third video 331 related to the first video 311 are displayed under control of a controller 180. The first to third videos 311 to 331 may be displayed in a thumbnail image shape having a small size. At leas one of the first to third videos 311 to 331 may be displayed as a still image or an image currently played.

The second video 321 and the third video 331 each have a similar photographing position and a similar photographing time to the first video 331. When photographing positions and photographing times are different by a certain degree or less, relevance may be recognized. For example, when the second video 321 and the third video 331 are captured at a point within a 1-km radius from a photographing position of the first video 311 and are captured within one hour after a photographing time of the first video 311, the relevance may be recognized.

In addition, the second video 321 and the third video 331 may be placed and displayed on the display unit 151 under control of the controller 180 according to the presence or absence of similarity of a photographing position or a subject with respect to the first video 311. For example, the controller 180 may determine a position at which each of the second video 321 and the third video 331 is displayed on the display unit 151, through metadata on a photographing position and a photographing direction of each of the second video 321 and the third video 331.

When the user inputs the pinch-in touch again in a state as shown in (b) of FIG. 15, as shown in (c) of FIG. 15, when the first video 311, the second video 321, and the third video 331 are further reduced and displayed, other additional videos 341 and 351 related to the first video 311 are displayed.

As shown in (c) of FIG. 15, other additional videos 341 and 351 may be placed according to relevance to the first video 311. For example, when proximity of a photographing place to the first video 311 is increased, videos may be disposed adjacent to a center of a screen in a horizontal direction thereof. In addition, when image similarity to the first video 311 is increased, videos may be displayed to a larger size. For example, the first video 321 and the third video 331 have substantially the same photographing proximity and the same image similarity to the first video 311.

In addition, videos are disposed in a vertical direction in comparison with the photographing time of the first video 311. For example, a fourth video 341 is a video captured before the photographing time of the first to third videos 311 to 331, and a fifth video 351 is a video captured after the photographing time of the first to third videos 311 to 331.

When similarity of a photographing place or a photographing time is not determinable as in a case of a TV drama or a cartoon, videos may be disposed adjacent to the first video 311 based on similarity of a video title or a video screen.

On the other hand, when the user touches and selects any one video in a state as shown in (b) or (c) of FIG. 15, the controller 180 may perform control to display the selected one video instead of the first video 311.

As described above, according to the mobile terminal and the method for controlling the same according to the embodiments of the present disclosure, videos related to a video currently displayed may be aligned through a step-by-step pinch-in touch input such as a first pinch-in touch input and a second pinch-in touch input, thereby easily selecting and playing the related videos.

Figure 16:
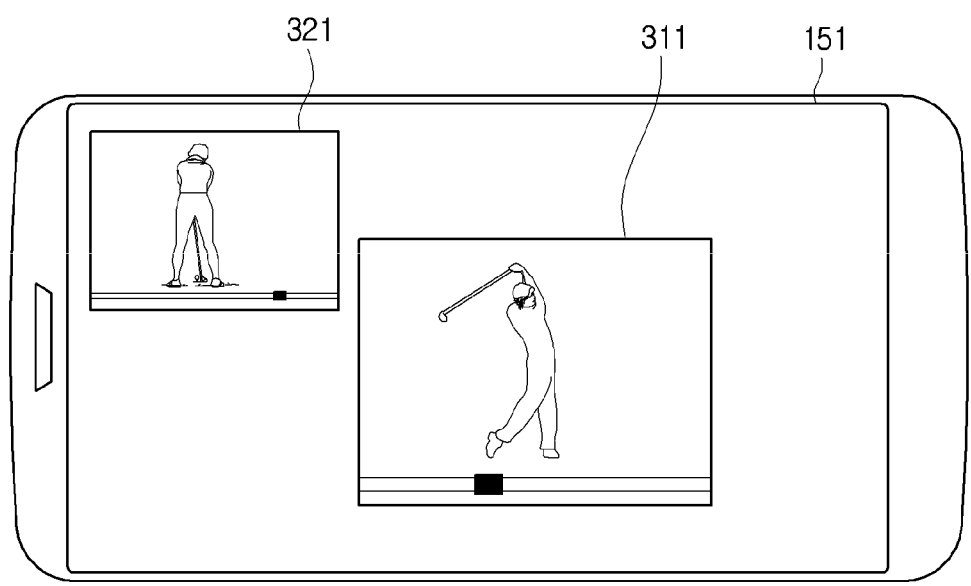

FIG. 16 is a diagram illustrating a screen in a case where a first pinch-in touch is input. As shown in FIG. 16, when the user inputs a pinch-in touch while a first video 311 is displayed, while the first video 311 is reduced and displayed, a second video 321 related to the first video 311 is displayed.

The second video 321 is a related video having a photographing position and a photographing time different by a certain degree or less from those of the first video 311. A progress bar may be displayed on a lower side of the first video 311, and a progress bar may also be displayed on a lower side of the second video 321 related to the first video 311. A photographing time of an image displayed in the first video 311 is the same as that of an image displayed on the second video 321. The second video 321 is displayed from a portion at which an image related to the image displayed on the first video 311 is placed.

Figure 17:
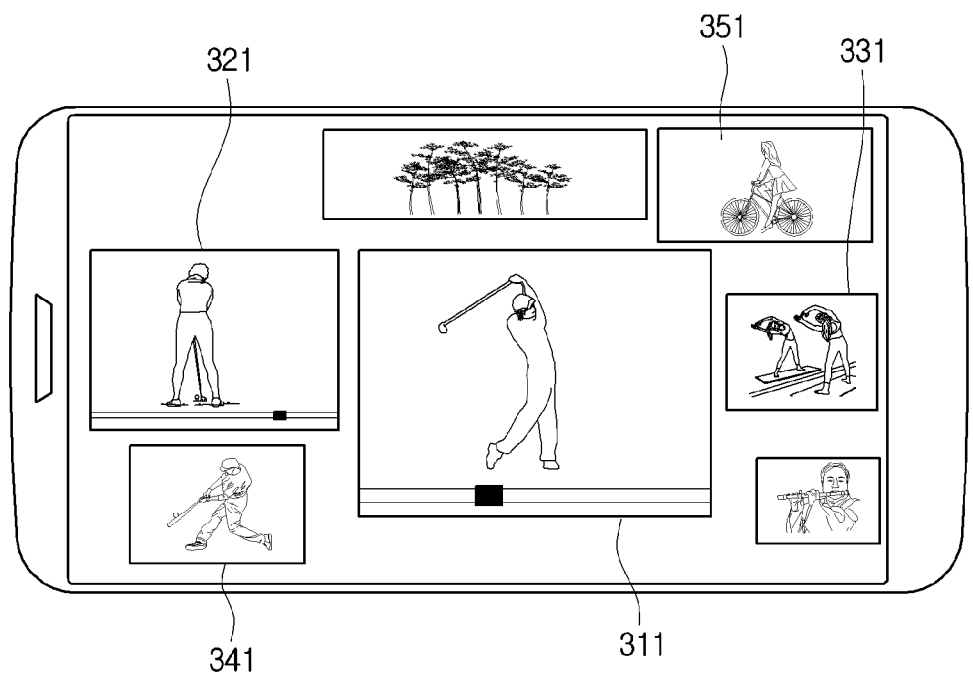

FIG. 17 is a diagram illustrating a screen in a case where a second pinch-in touch is input. As shown in FIG. 17, when the user inputs a second pinch-in touch, while the first video 311 and the second video 321 of FIG. 16 are reduced and displayed, other additional videos 331, 341, and 345 related to the first video 311 are displayed. As illustrated in FIG. 15, the additional videos 331, 341, and 345 may be placed according to proximity of a photographing place and an order of a photographing time. As proximity of the photographing place and proximity of the photographing time are increased, the additional videos 331, 341, and 345 may be disposed more adjacent to the first video 311 and a screen thereof may be displayed to a larger size.

In addition, a progress bar is also displayed on the second video 321 that is a video having a photographing position and a photographing time different by a certain degree or less from those of the first video 311, as illustrated in FIG. 16.

On the contrary, a progress bar is not displayed on the third video 331 that is a video not related to the first video 311 and having a photographing position or a photographing time different beyond a certain degree from that of the first video 311.

Figure 18:
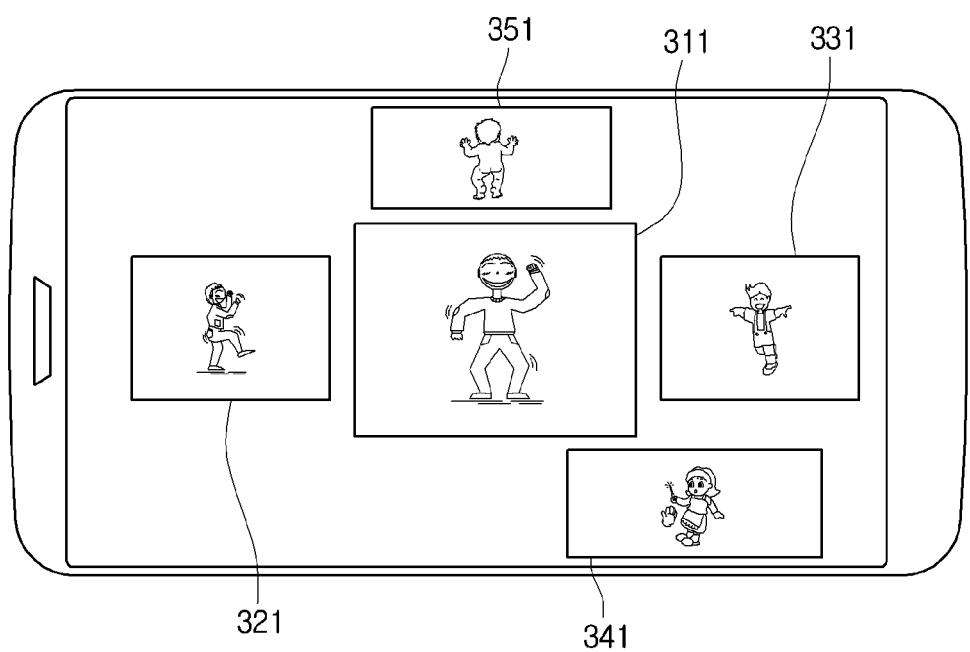

FIG. 18 is a diagram illustrating a screen in a case where a first pitch-in touch and a second pitch-in touch are input while a cartoon video is displayed. As shown in FIG. 18, when a first pinch-in touch and a second pinch-in touch are input while a first video 311 is displayed, while the first video 311 is reduced and displayed, other additional videos 321, 331, 341, and 351 are displayed.

Since a cartoon video does not include information on a photographing place or a photographing time, videos are displayed adjacent to the first video 311 based on similarity of a video title or a video screen.

Figure 19:
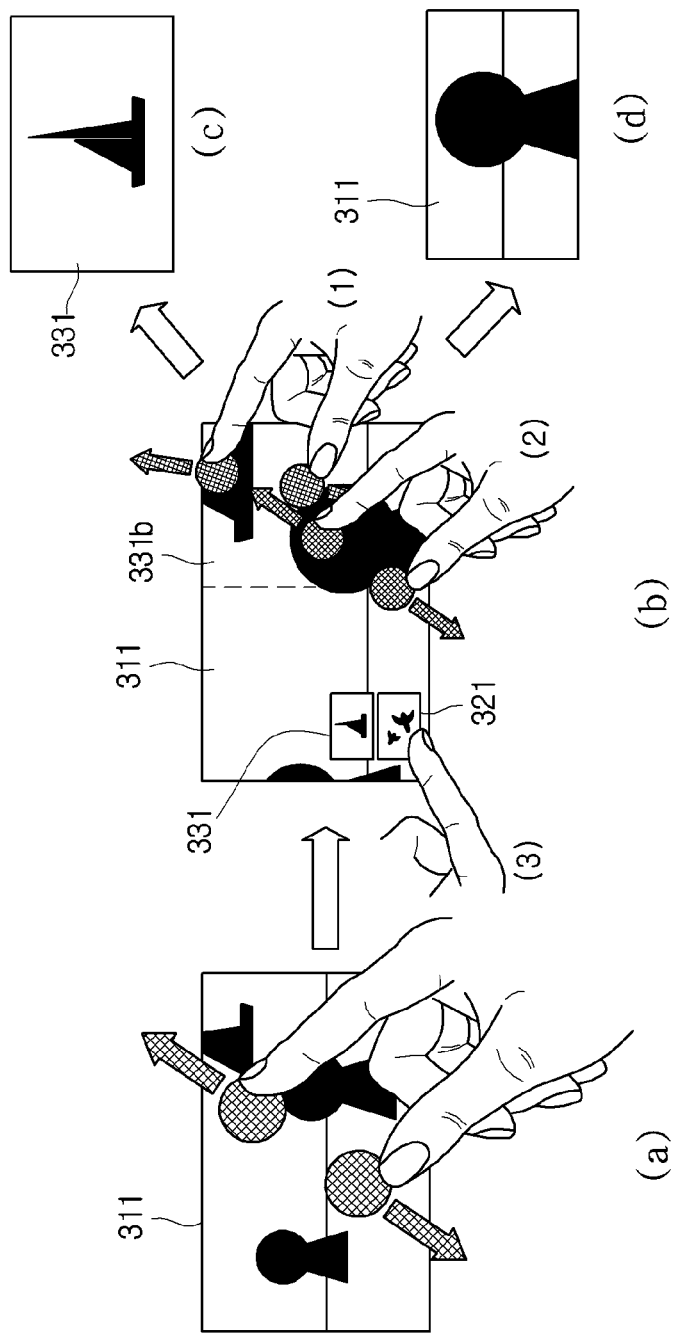

Referring to FIG. 19, when the user inputs a pinch-out touch operation on a display unit 151 in (a) of FIG. 19 while a first video 311 is displayed on the display unit 151 including a touch screen formed thereon, as shown in (b) of FIG. 19, while first video 311 is reduced and displayed, a second video 321 and a third video 331 related to the first video 311 are displayed under control of a controller 180.

The second video 321 and the third videos 331 may be displayed on one side of the first video 311 in a thumbnail image shape having a small size.

The second video 321 and the third video 331 each have a similar photographing position and a similar photographing time to the first video 311. When photographing positions and photographing times are different by a certain degree or less, relevance may be recognized. For example, when the second video 321 and the third video 331 are captured at a point within a 1-km radius from a photographing position of the first video 311 and are captured within one hour after a photographing time of the first video 311, the relevance may be recognized.

In addition, when the third video 331 includes a subject identical or similar to a subject of an image displayed in the first video 311, as illustrated in FIG. 10, an overlap region 331b corresponding to a third video 331 may be displayed.

When the user inputs a pinch-out touch with respect to the overlap region 331b (1), as shown in (c) of FIG. 19, the third video 331 corresponding to the overlap region 331b is displayed as a main screen.

When the user inputs a pinch-out touch with respect to a portion of the first video 311 rather than the overlap region 331b (2), as shown in (d) of FIG. 19, an image is enlarged and displayed with respect to the portion on which the pinch-out touch is input.

When the user performs a touch input on the second video 321 or the third video 331 displayed in a thumbnail image shape (3), the second video 321 or the third video 331 are enlarged and displayed as a main screen.

Figure 20:
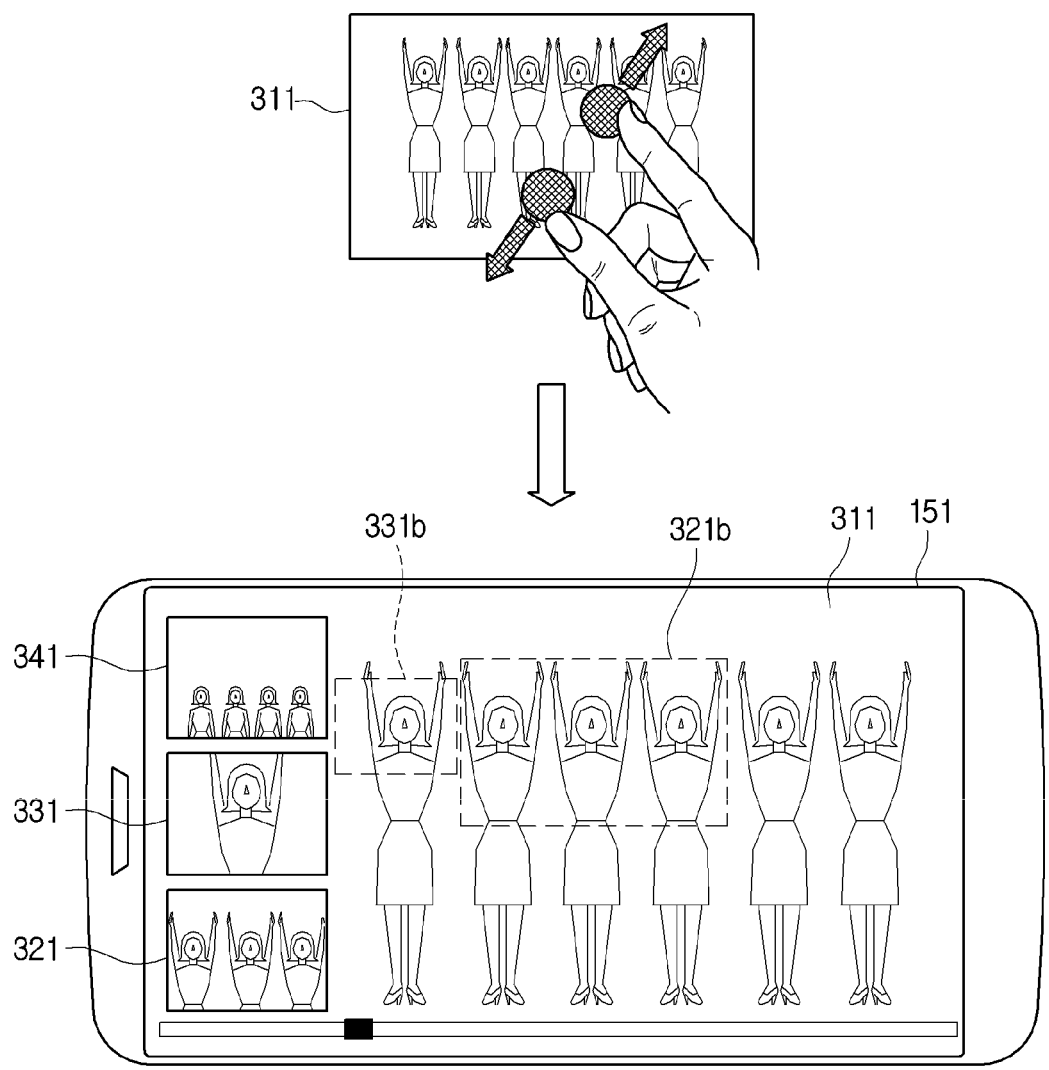

Referring to FIG. 20, as illustrated in FIG. 19, when the user inputs a first pinch-out touch on a display unit 151 while a first video 311 is displayed, while the first video 311 is enlarged and displayed, a second video 321, a third video 331, and a fourth video 341 related to the first video 311 are displayed under control of a controller 180.

The second to fourth videos 321 to 341 may be displayed on one side of the first video 311 in a thumbnail image shape having a small size.

The second to fourth videos 321 to 341 each have a similar photographing position and a similar photographing time to the first video 311. When photographing positions and photographing times are different by a certain degree or less, relevance may be recognized. For example, when the second to fourth videos 321 to 341 are captured at a point within a 1-km radius from a photographing position of the first video 311 and are captured within one hour after a photographing time of the first video 311, the relevance may be recognized.

In addition, when the second video 321 or the third video 331 includes a subject identical or similar to a subject of an image displayed in the first video 311, as illustrated in FIG. 10, overlap regions 321*b* and 331*b* may be displayed.

Figure 21:
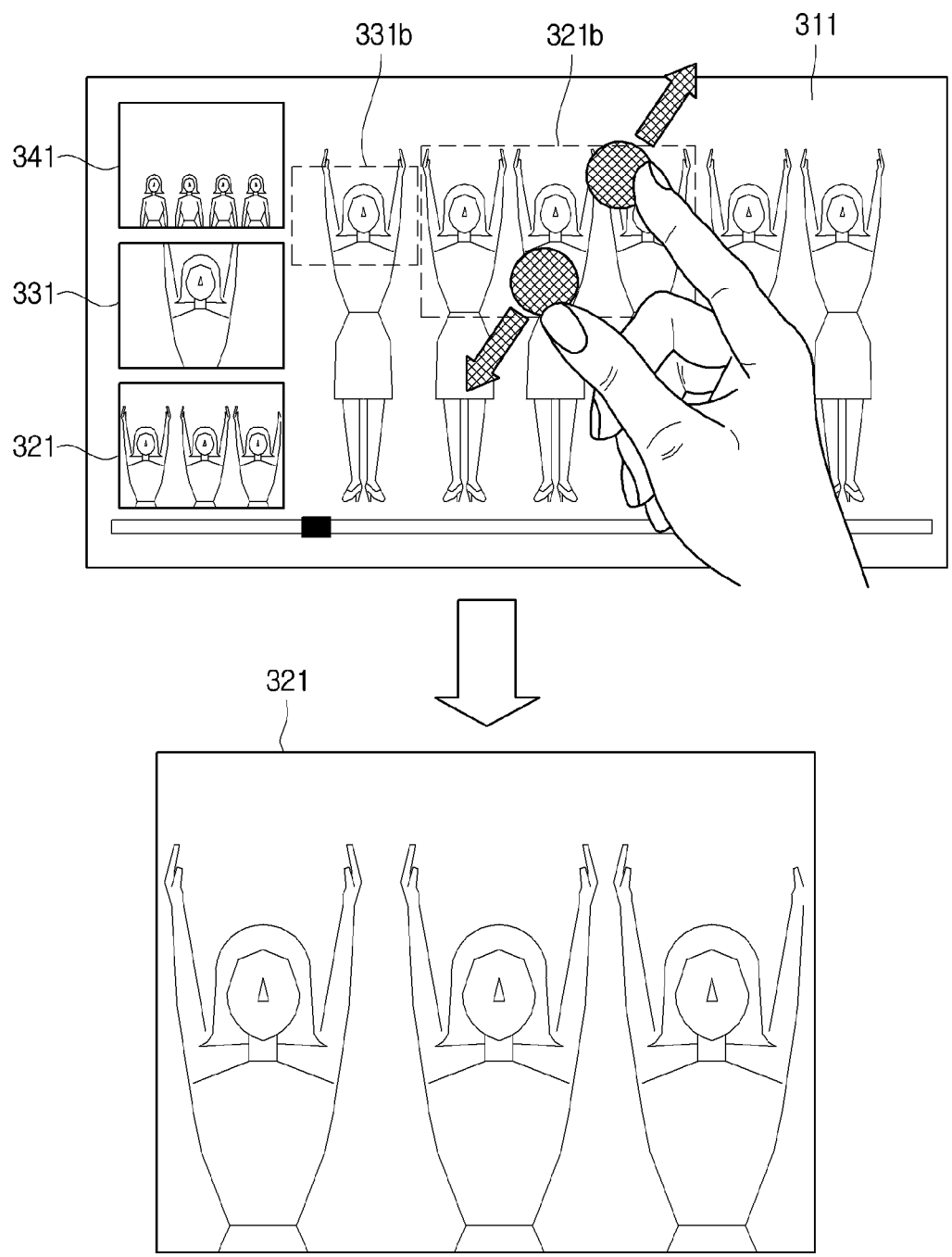

Referring to FIG. 21, when the user inputs a second pinch-out touch with respect to an overlap region 321*b* corresponding to a second video 321, as illustrated in (c) of FIG. 19, the second video 321 corresponding to the overlap region 321*b* is enlarged and displayed as a main screen.

A third video 331 and a fourth video 341 displayed in a thumbnail image shape may not be displayed.

Figure 22:
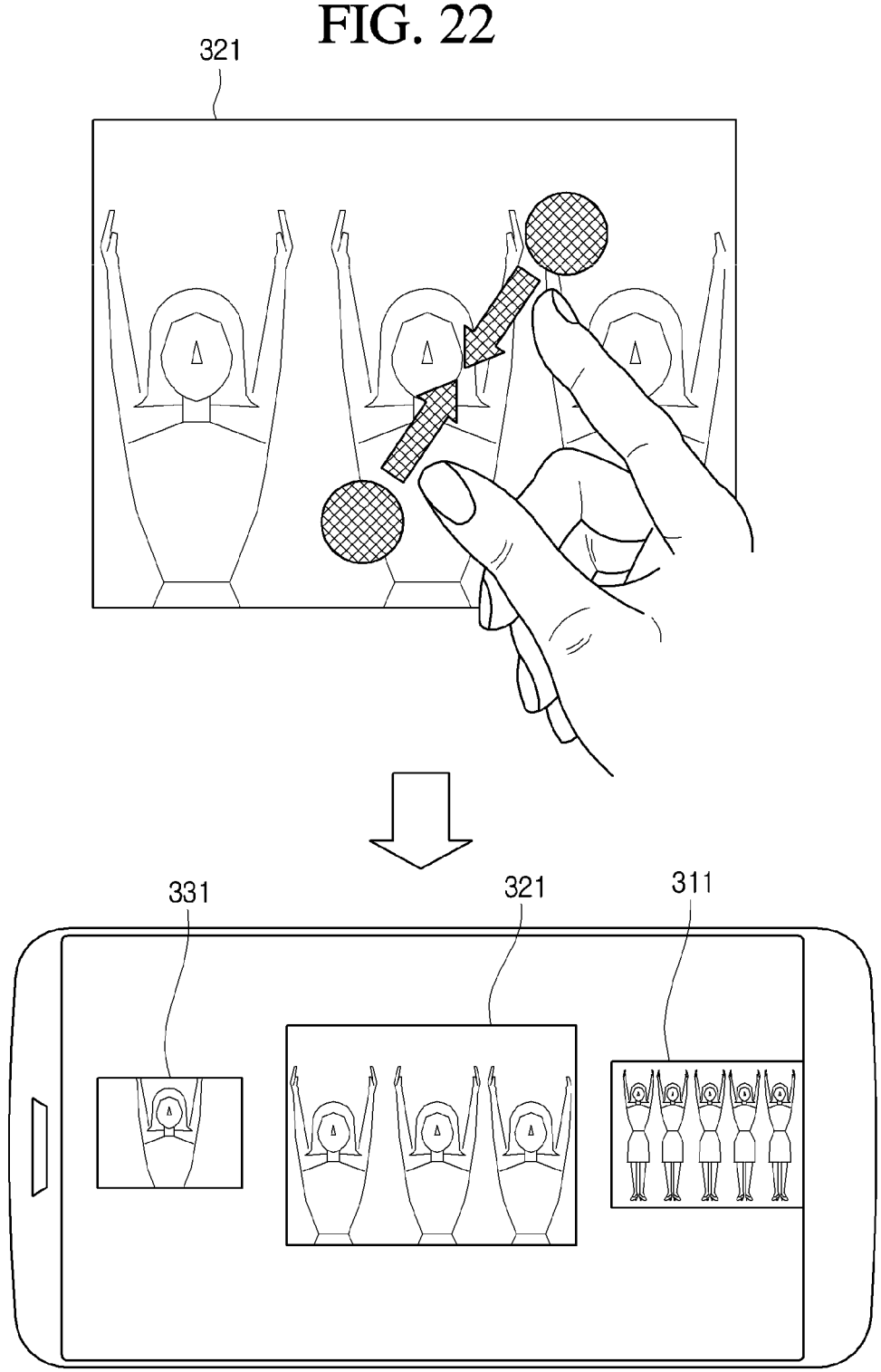

Referring to FIG. 22, when a pinch-in touch is input on the display unit 151 while the second video 321 is displayed, while the second video 321 is reduced and displayed, the first video 311 and the third video 331 related to the second video 321 are displayed together. In this case, when the user touches and selects the first video 311 or the third video 331, the first video 311 or the third video 331 is enlarged and displayed as a main screen.

Figure 23:
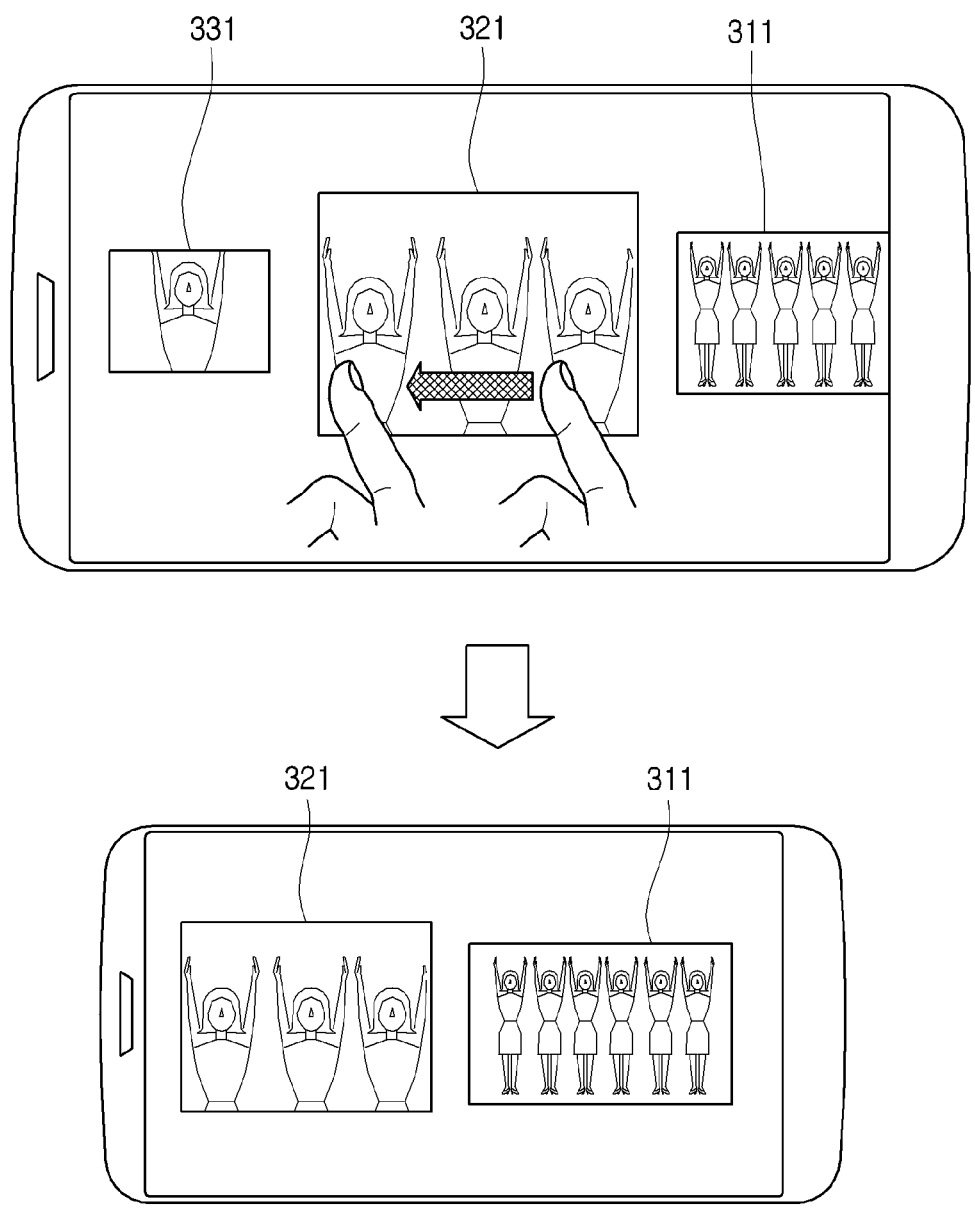

Referring to FIG. 23, when the user inputs a flicking touch or a drag touch in a left direction or right direction in a state in which the first video 311, the second video 321, and the third video 331 are displayed, the first to third videos 311 to 331 are moved and displayed in a direction of the flicking touch or the drag touch. Therefore, the user may select and display a desired video.

The present disclosure mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A mobile terminal comprising:
a display unit;
a memory configured to store videos; and
a controller configured to cause the display unit to:
display a first video of the videos stored in the memory; and
display a mark corresponding to a second video, the second video being related to the first video in terms of at least one of similarity of a photographing position, similarity of a photographing direction, or similarity of a subject,
wherein the mark corresponding to the second video is displayed on a partial area defined within the displayed first video based on a relative positional relationship between the first video and the second video.

2. The mobile terminal of claim 1, wherein the partial area is located at a peripheral area of the first video.

3. The mobile terminal of claim 1, wherein the mark corresponding to the second video is displayed on a subject of the first video.

4. The mobile terminal of claim 1, wherein the controller is further configured to cause the display unit to display the second video in response to a touch input received on the mark corresponding to the second video.

5. The mobile terminal of claim 4, wherein the controller is further configured to cause the display unit to display a mark corresponding to the first video on the second video.

6. The mobile terminal of claim 1, wherein a photographing position and a photographing time of the second video are different from a photographing position and a photographing time of the first video.

7. The mobile terminal of claim 6, wherein a photographing time of at least a portion of the second video is same as a photographing time of at least a portion of the first video.

8. The mobile terminal of claim 1, wherein similarity between a subject of the second video and a subject of the first video is greater than or equal to a preset threshold degree.

9. The mobile terminal of claim 1, wherein the controller is further configured to cause the display unit to display the mark corresponding to the second video according to a photographing position and a photographing direction of the second video based on a photographing position and a photographing direction of the first video.

10. The mobile terminal of claim 1, wherein the controller is further configured to cause the display unit to display the mark corresponding to the second video on the first video in response to a first pinch in touch received on the display unit.

11. The mobile terminal of claim 1, wherein, in response to a first pinch-in touch received on the display unit, the controller is further configured to cause the display unit to:
reduce and display the first video; and
display an image of the second video as the mark corresponding to the second video.

12. The mobile terminal of claim 11, wherein the controller is further configured to cause the display unit to display a third video of the videos stored in the memory according to proximity of a photographing place and proximity of a photographing time to the first video in response to a second pinch in touch received on the display unit.

13. The mobile terminal of claim 12, wherein, as the proximity of the photographing place and the proximity of the photographing time to the first video are increased, the second video and the third video are disposed more adjacent to the first video and a screen is displayed to a larger size.

14. The mobile terminal of claim 11, wherein the controller is further configured to cause the display unit to display an image of the second video, which is captured at a same time as an image of the first video currently displayed.

15. The mobile terminal of claim 1, wherein the controller is further configured to cause the display unit to display the mark corresponding to the second video on the first video.

16. The mobile terminal of claim 15, wherein the controller is further configured to cause the display unit to display the mark corresponding to the second video on a subject of the first video.

17. The mobile terminal of claim 15, wherein the controller is further configured to cause the display unit to display the second video in response to a touch received on the mark corresponding to the second video.

18. The mobile terminal of claim 15, wherein the controller is further configured to cause the display unit to display a mark corresponding to the first video on the second video.

19. The mobile terminal of claim 15, wherein a photographing position and a photographing time of the second video are different from a photographing position and a photographing time of the first video.

20. The mobile terminal of claim 15, wherein a capturing time of at least a partial image of the second video is same as a capturing time of at least a partial image of the first video.

21. The mobile terminal of claim 15, wherein similarity between a subject of the second video and a subject of the first video is greater than or equal to a preset threshold degree.

22. The mobile terminal of claim 15, wherein the controller is further configured to cause the display unit to display the second video in response to a second pinch in touch received on the mark corresponding to the second video.

23. The mobile terminal of claim 22, wherein, in response to a pinch-in touch received on the second video, the controller is further configured to cause the display unit to:
reduce and display the second video; and
display the first video related to the second video.

24. A mobile terminal comprising:
a camera configured to capture a first video;
a display unit configured to display the first video captured by the camera;
a wireless communication unit configured to transmit/receive data; and
a controller configured to:
control the camera, the display unit, and the wireless communication unit; and
cause the display unit to display a mark corresponding to a second video transmitted from an external terminal on the first video according to a photographing position and a photographing direction of the external terminal, the external terminal being connected to the wireless communication unit through a network,
wherein the mark corresponding to the second video is displayed on a partial area defined within the displayed first video based on a relative positional relationship between the first video and the second video.

25. The mobile terminal of claim 24, wherein the mark corresponding to the second video is an image of the second video.

* * * * *